(12) United States Patent
Brück et al.

(10) Patent No.: US 8,978,361 B2
(45) Date of Patent: Mar. 17, 2015

(54) APPARATUS FOR DELIVERING A REDUCING AGENT AND METHOD FOR PRODUCING A MOTOR VEHICLE

(75) Inventors: Rolf Brück, Bergisch Gladbach (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 928 days.

(21) Appl. No.: 12/942,470

(22) Filed: Nov. 9, 2010

(65) Prior Publication Data
US 2011/0113765 A1    May 19, 2011

Related U.S. Application Data

(63) Continuation of application No. PCT/EP2009/054910, filed on Apr. 23, 2009.

(30) Foreign Application Priority Data

May 9, 2008 (DE) .................. 10 2008 022 991

(51) Int. Cl.
*F01N 3/00* (2006.01)
*F01N 3/10* (2006.01)
(Continued)

(52) U.S. Cl.
CPC ........... *F01N 3/2066* (2013.01); *F01N 2260/02* (2013.01); *F01N 2260/12* (2013.01); *F01N 2610/02* (2013.01); *F01N 2610/10* (2013.01); *F01N 2610/11* (2013.01);
(Continued)

(58) Field of Classification Search
USPC .................... 60/286, 295, 300, 301, 303, 320
See application file for complete search history.

(56) References Cited

U.S. PATENT DOCUMENTS 6,050,088 A * 4/2000 Brenner .......................... 60/303
6,209,315 B1 * 4/2001 Weigl .............................. 60/274
(Continued)

FOREIGN PATENT DOCUMENTS

DE        19919426 C1     3/2000
DE        103 24 482 A1   12/2004
(Continued)

OTHER PUBLICATIONS

International Search Report of PCT/EP2009/054910, Dated Sep. 8, 2009.

*Primary Examiner* — Thomas Denion
*Assistant Examiner* — Diem Tran
(74) *Attorney, Agent, or Firm* — Laurence A. Greenberg; Werner H. Stemer; Ralph E. Locher

(57) ABSTRACT

A device for delivering a reducing agent, in particular a liquid urea-water solution, includes at least two of the following elements: a storage device (e.g. a tank), a delivery device (e.g. a pump), a deflecting device (e.g. a valve), a detecting device (e.g. a sensor), a separating device (e.g. a filter) and an outlet device (e.g. a nozzle, injector), which are interconnected by a line device. At least one element is pressure-sensitive and the adjacent line device near the pressure-sensitive element forms at least one heat sink. A device having a targeted freezing behavior is thus provided, allowing pressure-sensitive elements to be protected. A method for producing a motor vehicle is also provided.

9 Claims, 2 Drawing Sheets

(51) Int. Cl.
  *F01N 3/02* (2006.01)
  *F01N 3/20* (2006.01)
(52) U.S. Cl.
  CPC .... *F01N 2610/14* (2013.01); *F01N 2610/1426* (2013.01); *F01N 2610/148* (2013.01); *Y02T 10/24* (2013.01)
  USPC ............... 60/286; 60/274; 60/303; 60/320

(56) References Cited

U.S. PATENT DOCUMENTS

| | | | |
|---|---|---|---|
| 6,513,323 B1 * | 2/2003 | Weigl et al. | 60/286 |
| 6,539,708 B1 * | 4/2003 | Hofmann et al. | 60/286 |
| 6,912,846 B2 * | 7/2005 | Huber et al. | 60/286 |
| 7,594,393 B2 * | 9/2009 | Offenhuber et al. | 60/286 |
| 7,614,213 B2 * | 11/2009 | Hirata et al. | 60/286 |
| 8,074,673 B2 | 12/2011 | Maisch et al. | |
| 2007/0266699 A1 | 11/2007 | Ripper et al. | |

FOREIGN PATENT DOCUMENTS

| | | |
|---|---|---|
| DE | 102004025062 A1 | 12/2005 |
| DE | 102005031510 A1 | 1/2007 |
| DE | 10 2005 061 145 A1 | 6/2007 |
| DE | 102006040411 A1 | 3/2008 |
| DE | 102008001092 A1 | 11/2008 |
| GB | 2 188 163 A | 9/1987 |
| JP | 2008261247 A | 10/2008 |

* cited by examiner

US 8,978,361 B2

APPARATUS FOR DELIVERING A REDUCING AGENT AND METHOD FOR PRODUCING A MOTOR VEHICLE

CROSS-REFERENCE TO RELATED APPLICATION

This is a continuation, under 35 U.S.C. §120, of copending International Application No. PCT/EP2009/054910, filed Apr. 23, 2009, which designated the United States; this application also claims the priority, under 35 U.S.C. §119, of German Patent Application DE 10 2008 022 991.1, filed May 9, 2008; the prior applications are herewith incorporated by reference in their entirety.

BACKGROUND OF THE INVENTION

Field of the Invention

The present invention relates to an apparatus for delivering a reducing agent, including at least two elements from the group including a storage device, a delivery device, a deflecting device, a detecting device, a separating device and an outlet device, which are connected to one another through a line device. The invention also relates to a method for producing a motor vehicle having a generic apparatus. The invention is used, in particular, in a system for providing ammonia and/or an ammonia precursor for an exhaust system of a mobile internal combustion engine, such as for example the exhaust system of a motor vehicle.

It is known that nitrogen oxides contained in exhaust gas can be reduced considerably by using a reducing agent. In that case, use is made, in particular, of the so-called SCR ("selective catalytic reduction") process, in which ammonia and/or an ammonia precursor is fed directly into the exhaust line in such a way that a conversion of the nitrogen oxides ($NO_x$) can take place therein. In that case, nitrogen oxides are reduced, with the addition of the reducing agent, to form $N_2$ (nitrogen) and $H_2O$ (water). Preferably, $CH_4N_2O$ (urea) or $NH_3$ (ammonia) is used as the reducing agent, which is present in aqueous solution (sometimes also referred to under the trade name "AdBlue") and is injected into the exhaust gas upstream of an SCR catalytic converter. A reduction takes place in the catalytic converter, which is accelerated by a catalyst surface. There are substantially two types of catalysts used for that purpose. One type is composed substantially of titanium dioxide, vanadium pentoxide, and tungsten oxide. The other type uses zeolites.

In that case, the provision of the reducing agent raises particular problems. It has on several occasions been sought to introduce the reducing agent, such as for example urea, into the exhaust line as finely dispersed liquid droplets using a compressed gas. Systems are also known in which the reducing agent is stored in liquid and/or solid form and then prepared before being dispensed into the exhaust system (evaporation and/or thermolysis and/or hydrolysis). Furthermore, methods and apparatuses are also known in which the reducing agent is injected in liquid form into the exhaust line, for example using a dosing valve and/or a dosing pump.

However, the provision of the water-containing reducing agent specifically in liquid form, for example as a urea-water solution, brings with it the risk of freezing at low temperatures. The urea-water solution has a freezing point of approximately −11° C., and in that case behaves in substantially the same way as water, specifically with the formation of ice and therefore with a volume expansion in those components of the SCR system which contain urea-water solution.

In order to prevent damage, it has already been proposed that the delivery apparatus for the urea-water solution be emptied and/or heated. Such known systems can, however, in part only be implemented with the cooperation of an engine management system, in such a way that permanent monitoring of the system with simultaneous monitoring of the outside temperature is required. Furthermore, drives, delivery systems and the like must be provided which perform several functions and/or are actuated separately. That system is therefore relatively complex and expensive.

SUMMARY OF THE INVENTION

It is accordingly an object of the invention to provide an apparatus for delivering a reducing agent and a method for producing a motor vehicle, which overcome the hereinafore-mentioned disadvantages and at least partially solve the highlighted problems of the heretofore-known apparatuses and methods of this general type. It is sought, in particular, to specify an apparatus for delivering a reducing agent, in particular a urea-water solution, which has freezing prevention detection for individual components of the apparatus. Furthermore, the apparatus should be of relatively simple construction and therefore also inexpensive to produce. Furthermore, it is also sought to specify a method for producing a motor vehicle in such a way that the apparatus for delivering the reducing agent is installed in such a way as to ensure long fault-free operation of the apparatus even under extremely cold conditions.

With the foregoing and other objects in view there is provided, in accordance with the invention, an apparatus for delivering a reducing agent. The apparatus comprises at least two elements selected from the group consisting of a storage device, a delivery device, a deflecting device, a detecting device, a separating device and an outlet device. At least one of the at least two elements is a pressure-sensitive element. A line device interconnects the at least two elements. The adjoining or adjacent line device forms at least one heat sink close to the pressure-sensitive element.

The apparatus according to the invention is, in particular, one in which a urea-water solution is metered into the exhaust-gas flow or into an exhaust system in the liquid state.

In this case, the reducing agent is generally stored in a storage device. Such a storage device is for example a tank, wherein the latter may if appropriate also include a plurality of tank volumes. The tank is produced, in particular, from plastic. Pressure compensating devices, filling level sensors, heating devices and the like may additionally be provided in the storage device.

The reducing agent, which is generally stored in the storage device in liquid form, is transported out of the storage device by a delivery device. Such delivery devices conventionally include a pump, such as for example a reciprocating piston pump, a diaphragm pump or the like.

A separating device, for example in the form of a filter, is preferably provided between the delivery device and the storage device. In this case, it is preferable for the separating device to always be subjected to flow only in one direction, and for the deposits from the reducing agent to therefore always accumulate on one side of the separating device.

The reducing agent is delivered by the delivery device, for example to the outlet device, such as for example an injector, a nozzle, an outlet valve or the like.

In this case, it is preferable for at least one deflecting device, for example a controllable or regulable valve, to be provided in the region between the delivery device and the outlet device in order to deflect a part of the reducing agent delivered by the delivery device, for example to a recirculation line to the storage device.

It is also possible for a detecting device, such as for example sensors for measuring the temperature and/or pressure and/or concentration of the reducing agent to be provided over the course of the apparatus for delivering the reducing agent.

The individual elements, that is preferably more than 2, in particular at least 3 or even at least 4 of the above-mentioned elements, are connected to one another through a line device. The line device may, in particular, include at least one pipe and/or hose.

It is very particularly preferable in this case to provide a line system in which the reducing agent flows through at least the following components in succession in order to reach the exhaust system: 1. storage device, 2. line device, 3. separating device, 4. line device, 5. delivery device, 6. line device with at least one detecting device, 7. controllable deflecting device to a recirculation line, 8. line device, 9. outlet device.

At least some of the above-mentioned elements may have a pressure-sensitive structure. This means, in particular, that they may be damaged and/or impaired in terms of function if subjected to an elevated pressure by the reducing agent. A pressure of the reducing agent of 6 to 10 bar will generally be present in the line device during the operation of the apparatus (hereinafter of the delivery device). If the reducing agent now remains in the line device and freezes, the pressure in the line device is increased due to the increase in volume of the reducing agent. In this case, the pressure which builds up in the line device can pose a risk to the pressure-sensitive element. Such a pressure-sensitive element is, in particular, the delivery device (in particular a diaphragm pump), the detecting device (in particular a pressure sensor) and/or the outlet device (in particular an injection nozzle).

It is now proposed in this case that the line device adjoining the at least one pressure-sensitive element close to the pressure-sensitive element form at least one heat sink. In other words, this also means that, in the direct vicinity of the pressure-sensitive element, one or both line devices are formed in such a way that they dissipate heat to the environment particularly quickly. This has the result, in particular, that the line device cools down particularly rapidly in precisely this zone. For this purpose, it is possible in this zone to provide suitable properties of the line device, such as for example thermal conductivity, heat dissipation surface area, heat capacity, heat penetration, heat transfer, etc. Active (controllable) cooling devices may also be provided if appropriate (fans, Peltier elements, etc.).

It can consequently be ensured in this way that, when the freezing temperature of the reducing agent is reached, the solidification and therefore the volume expansion begins precisely in the region of the heat sink. Since the heat sink is now positioned very close to the pressure-sensitive element, for example at a distance of a maximum of 500 mm, if appropriate at most 250 mm or even less than 100 mm, the liquid column between the heat sink and the adjoining pressure-sensitive element is very small. Consequently, over that short distance, only a very small pressure gradient can be built up, in such a way that no significant additional loading of the pressure-sensitive element can result. Consequently, the elements are protected specifically for the freezing state of the reducing agent which is situated in the line device.

In accordance with another preferred feature of the invention, the heat sink is formed through the use of a zone of the line device which has a larger surface area than other regions of the line device. For that purpose, it is possible for the wall of the line device to be structured (at least outwardly in the direction of the environment), that is to say to have elevations and depressions in circumferential directions. It is, however, also possible for the line section to be formed in the region of the zone with at least one additional component which forms the enlarged surface area. The component may, for example, be of an annular configuration surrounding the line device, for example in the manner of a sleeve, with cooling fins and the like being provided there if appropriate.

In accordance with a further advantageous feature of the invention, the heat sink is formed through the use of a zone of the line device which has a heat bridge to the environment. That means, in particular, that material, heat-conducting contact of the zone with a generally relatively cool environment is ensured. For that purpose, it is possible, in particular, for heat-conducting connections to the relatively cold environment to be realized, for example in the manner of a screw connection or the like. The relatively cold environment is realized, in particular, by components of the car body and/or components which are positioned so as to be in intensive contact with the relatively cold outside environment or in the region of influence of the ambient temperature. For that purpose, the heat sink is then constructed in such a way that a rapid dissipation from the region of the zone of the line device to the relatively cold environment is linked, for example through the use of corresponding conduction of heat.

In accordance with an added feature of the invention, the line device is formed with a flexible wall. Specifically for the situation in which a plurality of heat sinks are formed in connection with one line device, it is advantageous if the increase in volume generated upon the solidification of the reducing agent can be compensated by the line device itself. For that purpose, it is necessary for the line device to be selected as a plastic hose which has corresponding elastic or flexible properties and which itself can compensate, for example, an increase in volume of approximately 10% (in length and/or in the circumferential direction).

In accordance with an additional feature of the invention, the heat sink can be formed from a different material than other regions of the line device. The other material, for example metal, may be formed with the wall of the line device itself. It is, however, possible for another highly thermally conductive material to be positioned at the outside around the line device so as to be in heat-conducting contact with the line device. In some cases, it may also be expedient for the other material to penetrate through the wall of the line device. It is generally desirable for the line device to be formed from the same material over the length of the line device between two elements, with a deviation from that being provided precisely in the desired zone.

In accordance with yet another feature of the invention, an activatable heating device can be provided in the zone of the heat sink. Such a heating device is, in particular, of an electric nature, in such a way that it can be activated quickly and on demand. The heating device serves, in particular, to heat up the relatively cold-sensitive region of the line device during a restart of the system. For that purpose, it is possible to provide, for example, for electrical conductors, induction heaters or the like through which a flow can pass.

In accordance with yet a further feature of the invention, the line device is provided, adjacent the heat sink, with increased thermal insulation in relation to the other regions of the line device. In other words, that means, in particular that, adjacent the zones with the heat sink, the line device is constructed in such a way that it cools down at a slowed rate. It is thereby possible to realize defined cooling of the reducing agent and therefore also a targeted pressure build-up within the line device. The thermal insulation may be a constituent part of the wall of the line device. It is, however, also possible for the thermal insulation to be provided on the outside and/or the inside of the line device.

With the objects of the invention in view, there is also provided a method for producing a motor vehicle. The method comprises providing an apparatus for delivering a reducing agent having at least two elements selected from the group consisting of a storage device, a delivery device, a deflecting device, a detecting device, a separating device and an outlet device. At least one of the at least two elements is a pressure-sensitive element, the at least two elements are interconnected with a line device, and:

a) the at least two elements are placed on the motor vehicle;
b) the motor vehicle is cooled;
c) at least one freezing point or location in the line device adjoining a pressure-sensitive element is identified; and
d) at least one heat sink is formed between the freezing point and the pressure-sensitive element.

The method serves, in particular, for configuring the apparatus, described herein according to the invention, for delivering a reducing agent. In that respect, reference is likewise made to the explanations made in connection with the apparatus.

In the method proposed herein, the required apparatus for delivering the reducing agent is firstly positioned on the motor vehicle. The position and/or fastening points of the apparatus on the motor vehicle or the car body and/or the exhaust system, etc., is now clearly defined. In step (b), the cooling behavior of the apparatus for delivering the reducing agent in the vehicle is now determined. In this case, it is observed, in particular, at what location the reducing agent disposed in the line device freezes first and then commences its solidification process. It is thereby possible for freezing points and the freezing direction proceeding therefrom to be clearly determined. That is the purpose of step (c), in which it is at the same time identified what element the freezing point and/or the freezing direction raises a problem for, that is to say for what element an undesirably high pressure is built up in the line device adjacent the pressure-sensitive element upon solidification. If the reducing agent in the line device now reaches a pressure which is undesirable for the pressure-sensitive element, at least one heat sink is formed at a suitable zone (step (d)). In this case, the heat sink should be disposed between the freezing point and the pressure-sensitive element, preferably in the direct vicinity of the pressure-sensitive element. That now leads to a changed freezing behavior for the apparatus on the motor vehicle. The identified line device now cools firstly in the region of the heat sink and now exhibits a freezing behavior which results in a targeted (pressure-resistant) closure of the line device and/or a solidification front proceeding therefrom. If appropriate, the freezing point may also be formed with corresponding thermal insulation on the line device in order to slow the freezing process there. In that way, for the physical installation position of the apparatus on the motor vehicle, it is possible to reliably identify the freezing behavior and change it according to the invention.

In accordance with a concomitant feature of the invention, in that connection, it is considered to be particularly advantageous for a separate heat bridge to be positioned at the outside on the line section in the zone with the heat sink. In this case, the heat bridge is formed for example in the manner of a clamp which bears against the line device at the outside and is connected (for example in a force-locking manner) in heat-conducting fashion to a fast-cooling part of the car body. Such a separate heat bridge is easy to mount and may also be connected in a flexible manner to other parts of the motor vehicle. The heat bridge may then, if appropriate, also be connected at the outside to a housing of the pressure-sensitive element. A force-locking connection is one which connects two elements together by force external to the elements, as opposed to a form-locking connection which is provided by the shapes of the elements themselves.

Other features which are considered as characteristic for the invention are set forth in the appended claims.

Although the invention is illustrated and described herein as embodied in an apparatus for delivering a reducing agent and a method for producing a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
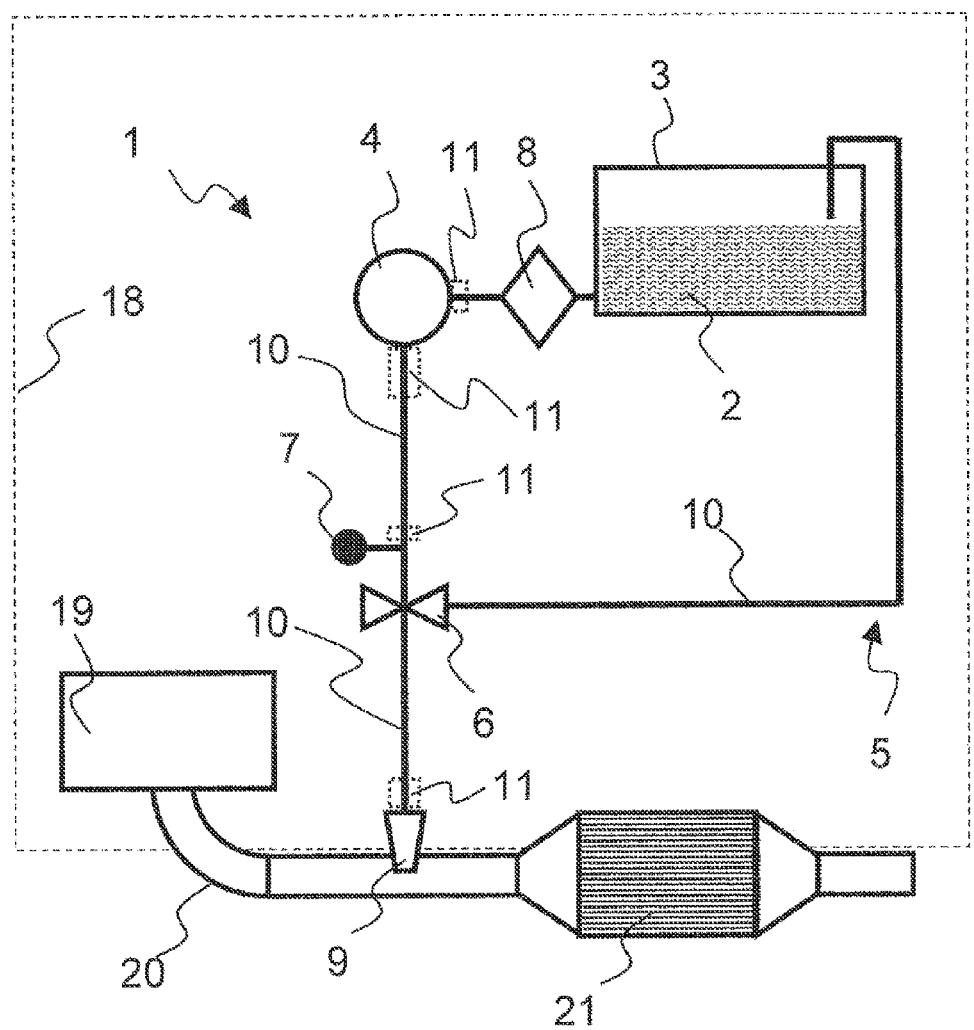
FIG. 1 is a diagrammatic and schematic plan view showing the basic construction of a preferred structural variant of the apparatus according to the invention, in a motor vehicle.

Referring now in detail to the figures of the drawings, which show particularly preferred structure variants, to which the invention is however not restricted, and in which the same reference numerals generally relate to the same elements, and first, particularly, to FIG. 1 thereof, there is seen a construction of a preferred structural variant of an apparatus 1 for delivering a reducing agent 2, such as, in particular, a urea-water solution. The apparatus 1 is diagrammatically and schematically illustrated in a motor vehicle 18. Such a motor vehicle 18 generally has an internal combustion engine 19, for example a diesel engine, in which exhaust gas is produced that is discharged to the environment through an exhaust line 20. A plurality of exhaust-gas treatment units, such as for example adsorbers, catalytic converters, filters, flow mixers and the like, are generally disposed in parts of the exhaust line 20. An SCR catalytic converter 21, which is shown by way of example herein and is disposed downstream, converts the reducing agent that has been mixed with the exhaust gas, in such a way that undesired nitrogen oxides are removed from the exhaust gas in this case (SCR process).

The apparatus 1 according to the invention is illustrated in the center. A storage device 3 in the form of a tank in which the liquid reducing agent 2, in this case a urea-water solution, is stored, is illustrated at the top right. When required, and at fixedly predefinable points in time, the reducing agent 2 is delivered out of the storage device 3, specifically using a delivery device 4. The delivery device 4, in particular a diaphragm pump, sucks the reducing agent 2 out of the storage device 3 through a separating device 8 in the form of a filter which is positioned in a line device 10 between the storage device 3 and the delivery device 4. Proceeding from the delivery device 4, the reducing agent is delivered to an outlet device 9, for example an injection nozzle, if reducing agent 2 is to be dispensed into the exhaust line 20.

In the structural variant shown herein, a deflecting device 6 is provided between the delivery device 4 and the outlet device 9. The deflecting device may serve, in particular, to reduce, when required, the pressure of the reducing agent 2 within the line device 10 between the delivery device 4 and the outlet device 9 when the apparatus 1 is not in operation. For that purpose, the reducing agent situated in the line device 10 may be transferred back into the storage device 3 through a return line 5 and suitable line device 10. Furthermore, between the delivery device 4 and the deflecting device 6, the line device 10 includes a detecting device 7, for example a pressure sensor.

In order to protect pressure-sensitive elements (in this case the delivery device 4, the outlet device 9 and the detecting device 7) against excessively high pressure loading by the reducing agent when it freezes, heat sinks 11 are formed directly adjacent those elements at one side and/or at both sides thereof. The reducing agent in the line device 10 freezes first in the region of the heat sinks 11, in such a way that no significant pressure build-up takes place in the direction of the pressure-sensitive elements.

Figure 2:
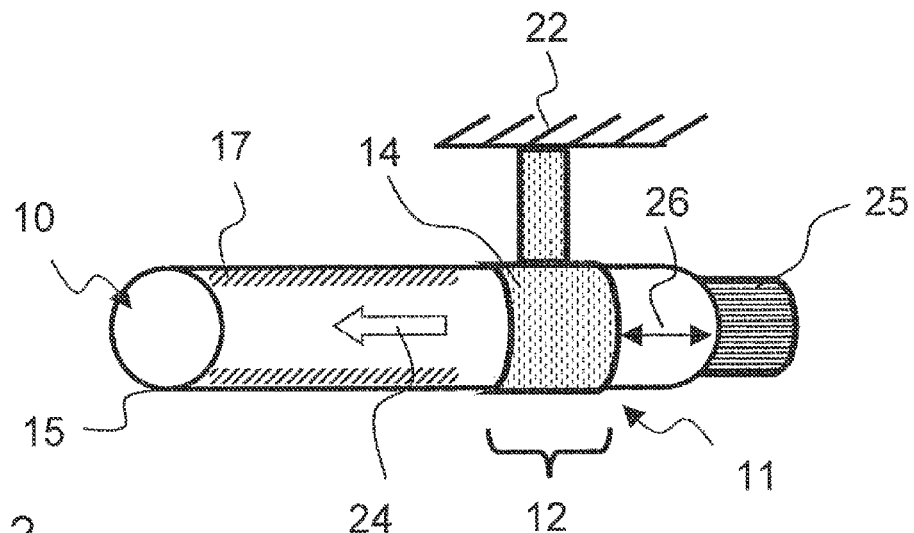
FIG. 2 is an enlarged, fragmentary, perspective view of a further structural variant of the apparatus according to the invention.

An example of a zone 12 with a heat sink 11 is shown in FIG. 2. In this case, the line device 10 is formed with a heat bridge 14, which is positioned at the outside on a wall 15 in a form-locking manner and so as to be in heat-conducting contact with the line device 10. The heat bridge 14, for example in the form of a clamp, is also connected to, that is to say, in particular, is in thermal contact with, a cold point 22. This has the result that, when the motor vehicle cools down, precisely the cold point 22 cools down rapidly and thereby extracts heat from the zone 12 of the line device 10. A relatively early solidification or freezing of the reducing agent is thus obtained in the zone 12. This then has the result that the pressure build-up in the direction of a connection 25 to a non-illustrated adjacent pressure-sensitive element remains small due to a short distance 26. Instead, the pressure build-up takes place in the direction of a freezing direction 24. The slowed freezing adjacent the zone 12 and opposite the connection 25 is improved by virtue of thermal insulation 17 being provided there.

Figure 3:
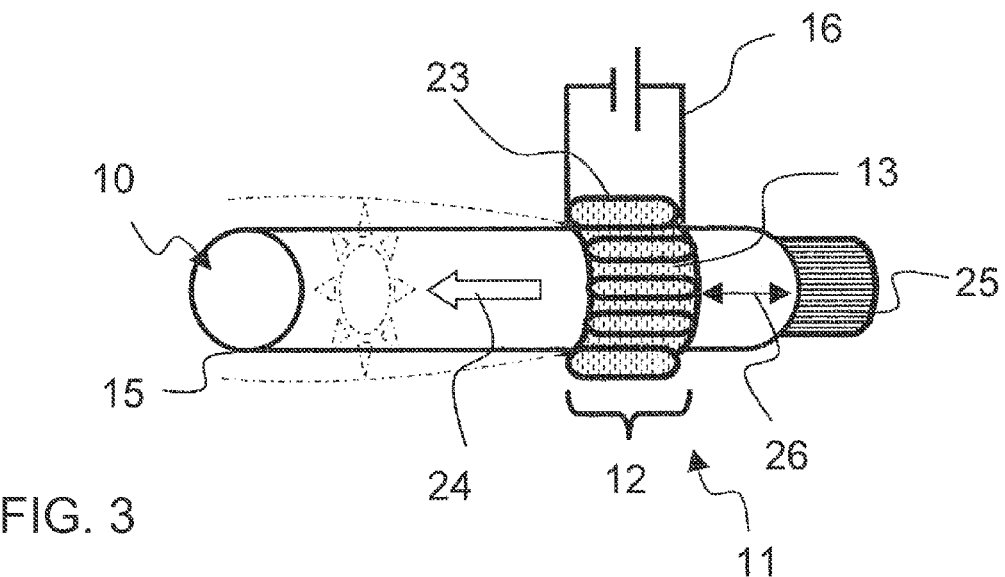
FIG. 3 is a fragmentary, perspective view of another structural variant of the apparatus for delivering a reducing agent.

Another example of an embodiment of a heat sink 11 is shown in FIG. 3. In this case, the zone 12 is formed with a radiator 23 which is likewise positioned on the line device 10 in a form-locking manner and, in particular, so as to be in heat-conducting contact therewith. The radiator 23 has a multiplicity of cooling fins which increase the size of an outer surface 13. This also serves to promote early freezing of the reducing agent in the line device 10 in the region of the zone 12. For this purpose, the zone 12 is preferably formed directly at the connection 25, for example at a maximum distance 26 of 50 mm from the latter.

It can also be seen in the left-hand partial region of FIG. 3 that the line device 10 is formed with a flexible wall 15. Therefore, if the reducing agent situated therein freezes proceeding from the zone 12 in the freezing direction 24, the flexible wall 15 can compensate for the increase in volume by expanding in cross section. It is thus possible, in particular, to provide a compensating volume toward the nearest heat sink and/or the nearest element.

For the situation in which the line device 10 has been completely frozen, it is also advantageous to ensure a fast liquefaction of the reducing agent. For that purpose, it is proposed herein that the zone 12 or the radiator 23 be formed with a heating device 16, in such a way that electrical energy can be provided on demand and quickly. The electrical energy ensures a supply of heat to the line device 10 and therefore to the reducing agent.

The invention claimed is:

1. An apparatus for delivering a reducing agent, the apparatus comprising:
    at least two elements selected from the group consisting of a storage device, a delivery device, a deflecting device, a detecting device, a separating device and an outlet device, at least one of said at least two elements being a pressure-sensitive element;
    a line device interconnecting said at least two elements, said line device forming at least one heat sink close to said pressure-sensitive element, said line device having a zone and other regions, said zone having a larger surface area than said other regions, and said zone forming said at least one heat sink; and
    said at least one heat sink providing a heat bridge connecting a region of said line device forming said at least one heat sink to components of a motor vehicle body or components positioned to be in intensive contact with the outside environment.

2. The apparatus according to claim 1, wherein said line device has an activatable heating device disposed in said zone.

3. The apparatus according to claim 1, wherein said line device has increased thermal insulation relative to said other regions, said increased thermal insulation being adjacent said at least one heat sink.

4. The apparatus according to claim 1, wherein said line device is formed with a flexible wall.

5. A method for producing a motor vehicle, the method comprising the following steps:
    providing an apparatus for delivering a reducing agent having at least two elements selected from the group consisting of a storage device, a delivery device, a deflecting device, a detecting device, a separating device and an outlet device, at least one of the at least two elements being a pressure-sensitive element;
    interconnecting the at least two elements with a line device;
    a) placing the at least two elements on the motor vehicle;
    b) cooling the motor vehicle;
    c) identifying at least one freezing point in the line device adjoining a pressure-sensitive element;
    d) forming at least one heat sink between the freezing point and the pressure-sensitive element; and
    forming the at least one heat sink by carrying out at least one of the following steps:
        forming the heat sink by choosing a different material for the line device in a region of the heat sink than in other regions of the line device; or
        forming the heat sink by providing a heat bridge connecting a region of the line device forming the heat sink to components of a motor vehicle body or components positioned to be in intensive contact with the outside environment.

6. The method according to claim 5, wherein the line device has a zone forming the at least one heat sink and a separate heat bridge is positioned at an outside of the line device in the zone.

7. The method according to claim 5, which further comprises:
    placing the heat bridge in thermal contact with a cold point cooling down as the motor vehicle cools down; and
    extracting heat from the freezing point to the cold point causing solidification or freezing of the reducing agent at the freezing point leading to a relatively small pressure build-up in a direction toward the pressure-sensitive element and a relatively large pressure build-up in a freezing direction.

8. An apparatus for delivering a reducing agent, the apparatus comprising:
- at least two elements selected from the group consisting of a storage device, a delivery device, a deflecting device, a detecting device, a separating device and an outlet device, at least one of said at least two elements being a pressure-sensitive element;
- a line device interconnecting said at least two elements, said line device forming at least one heat sink close to said pressure-sensitive element, said line device having other regions, and said at least one heat sink being formed of a different material than said other regions; and
- said at least one heat sink providing a heat bridge connecting a region of said line device forming said at least one heat sink to components of a motor vehicle body or components positioned to be in intensive contact with the outside environment.

9. An apparatus for delivering a reducing agent, the apparatus comprising:
- at least two elements selected from the group consisting of storage means, delivery means, deflecting means, detecting means, separating means and outlet means, at least one of said at least two elements being a pressure-sensitive element;
- line means interconnecting said at least two elements, said line means forming at least one heat sink close to said pressure-sensitive element, said line means having other regions and said at least one heat sink being formed of a different material than said other regions; and
- said at least one heat sink providing a heat bridge connecting a region of said line device forming said at least one heat sink to components of a motor vehicle body or components positioned to be in intensive contact with the outside environment.

* * * * *